(12) United States Patent
Weingärtner et al.

(10) Patent No.: US 7,783,148 B2
(45) Date of Patent: Aug. 24, 2010

(54) FIBER-OPTIC APPARATUS FOR RECEIVING EMITTED RADIATION OF A DIODE LASER, AND METHOD FOR PRODUCING A FIBER-OPTIC APPARATUS OF THE TYPE

(75) Inventors: Thomas Weingärtner, Gau-Algesheim (DE); Matthias Ertl, Bischofsheim (DE); Thomas Reichert, Wachernheim (DE)

(73) Assignee: Schott AG, Mainz (DE)

( * ) Notice: Subject to any disclaimer, the term of this patent is extended or adjusted under 35 U.S.C. 154(b) by 42 days.

(21) Appl. No.: 12/338,255

(22) Filed: Dec. 18, 2008

(65) Prior Publication Data
US 2009/0169160 A1    Jul. 2, 2009

(30) Foreign Application Priority Data
Dec. 18, 2007    (DE) .................. 10 2007 061 655

(51) Int. Cl.
G02B 6/04    (2006.01)
(52) U.S. Cl. .................. 385/120; 385/121; 385/135
(58) Field of Classification Search .................. 385/120, 385/121, 137
See application file for complete search history.

(56) References Cited

U.S. PATENT DOCUMENTS

| 5,436,990 | A | 7/1995 | Head et al. |
|---|---|---|---|
| 5,546,487 | A | 8/1996 | Fantone |
| 5,734,766 | A | 3/1998 | Flint |
| 6,819,861 | B2 * | 11/2004 | Ota et al. .................. 385/146 |

FOREIGN PATENT DOCUMENTS

| DE | 195 00 513 C1 | 7/1996 |
|---|---|---|
| DE | 10 2004 006 932 B3 | 10/2005 |
| EP | 0 486 175 B1 | 5/1992 |
| WO | 97/42533 A1 | 11/1997 |

* cited by examiner

Primary Examiner—Jerry T Rahll
(74) Attorney, Agent, or Firm—Laurence A. Greenberg; Werner H Stemer; Ralph E Locher (57) ABSTRACT

A fiber-optic apparatus for receiving emitted radiation from a diode laser having at least one diode laser bar with a multiplicity of emitters which are arranged in at least one row alongside one another in the direction of their longitudinal axis. The fiber-optic apparatus has at least one optical fiber bundle that is associated with the diode laser bar and into which the laser beam is injected. Each emitter has a multiplicity of associated optical fibers. The optical fibers are hot-fused to one another under pressure and without regulation on the input side in order to form at least one fiber wedge with an inlet surface. The emitters of the diode laser bar are directly associated with at least one inlet surface in order to completely receive the laser light emitted from the diode laser bar.

28 Claims, 6 Drawing Sheets

FIBER-OPTIC APPARATUS FOR RECEIVING EMITTED RADIATION OF A DIODE LASER, AND METHOD FOR PRODUCING A FIBER-OPTIC APPARATUS OF THE TYPE

CROSS-REFERENCE TO RELATED APPLICATION

This application claims the priority, under 35 U.S.C. §119, of German application DE 10 2007 061 655.6, filed Dec. 18, 2007; the prior application is herewith incorporated by reference in its entirety.

BACKGROUND OF THE INVENTION

Field of the Invention:

The invention relates to a fiber-optic apparatus for receiving emitted radiation from a diode laser.

A diode laser is normally composed of a plurality of so-called diode laser bars. Each diode laser bar in this case comprises a multiplicity of emitters. The emitters are narrow, rectangular semiconductor elements which are themselves composed of a multiplicity of semiconductor surfaces which are arranged closely adjacent alongside one another. The narrow faces of the semiconductor surfaces are arranged alongside one another in a row.

A diode laser bar produces a narrow, approximately rectangular, laser beam whose beam characteristics in the longitudinal direction differ from the beam characteristics on the axis at right angles to this. Owing to these asymmetrical beam characteristics and the beam combination which is normally required of a plurality of diode laser bars in order to increase the power of the diode laser, its design requires beamforming, that is to say beam symmetry and beam superimposition, of the emitted radiation. This applies in particular to high-power diode lasers in which the laser beam is intended to be carried by way of optical fibers.

Various concepts are described in the prior art for the process of making the beam symmetrical. The beam reshaping can be carried out reflectively with the aid of microlayers, refractively by means of microprisms, or else diffractively. Free-beam concepts which operate with micromirrors or microprisms allow the original beam quality of the diode laser bar to be largely maintained. Concepts such as these, (cf., for example, German patent DE 195 00 513 C1) require very exact manufacturing processes, however, and therefore involve a large amount of technical effort and complex adjustment of the components. The costs of a device such as this for beam reshaping or beam forming are therefore relatively high.

A further possibility for beam reshaping is to inject the laser beam emerging from the individual emitters in each case into an optical fiber associated with it, and for the optical fibers subsequently to be reoriented from a linear arrangement to a circular arrangement. Beam reshaping such as this can be achieved considerably more cost-effectively with the aid of fiber bundles (cf., for example, European patent EP 0 486 175 B1). However, the concepts which have been used until now in each case provide one optical fiber per emitter, of which a typical diode laser bar has approximately 19, with a lateral extent in the longitudinal direction of 150 µm in each case. As a result of the highly asymmetric emission of an individual emitter with an extent of about 1 µm×150 µm and a divergence angle of about 30°×5° (half angle), the use of round optical fibers, whose diameter must correspond at least to the lateral extent of an emitter, unavoidably leads to high losses with regard to the beam quality at the optical fiber outlet. The beam quality in the vertical extent in the direction of the narrow face, the fast axis, is decreased by a factor which corresponds to the ratio of the diameter of the optical fibers and the vertical extent of the fast axis of the emitter. European patent EP 0 486 175 B1 therefore also discloses the use of rectangular optical fibers, whose lateral extent is matched to the length of the emitter. In one embodiment, their extent at right angles thereto is between 30 and 50 µm.

As an alternative to this, international PCT publication WO 97/42533 A1 discloses an assembly in which round optical fibers are provided. These are arranged, at their free end facing the emitter, in a wedge shape, in each case with a rectangular inlet surface. Individual fibers with cross-sectional shapes such as these can be produced, however, only with a large amount of manufacturing effort.

U.S. Pat. No. 5,546,487 discloses an assembly in which the laser beam which emerges from an emitter (1 µm×100 µm) which comprises a multiplicity of facets (1 µm×5 µm) is injected into a multiplicity of optical fibers with a rectangular cross section, which has an extent at right angles to the lateral direction which is approximately 2.5 to 15 times greater than that of the emitter. The laser beam emerging from an emitter is collimated in this direction (vertically) with the aid of a cylindrical lens, which is arranged between the diode laser bar and the optical fibers, to a beam size which is smaller than the vertical extent in the optical fibers, such that it illuminates only a portion of the inlet surface of the optical fibers. This results in a deterioration in the beam quality on the fast axis.

German patent DE 10 2004 006 932 B3 describes a diode laser in which the emitters have an associated device for beam forming and the guidance of the laser beam emerging from it. In this case, the emitters are arranged in a row alongside one another in the direction of their longitudinal axis (slow axis). This device for beam forming and beam guidance has a multiplicity of optical fibers, which are arranged alongside one another in a row. The laser beam of each emitter is injected into these optical fibers such that each emitter is associated with a multiplicity of optical fibers. In order to avoid radiation losses resulting from empty spaces between the individual circular cross sections, the fiber inlet cross sections, in this case in rectangular form, are matched to the geometry of the emitter. In this case, the fibers are arranged alongside one another in a row, touching, and without any empty spaces. The rectangular cross section of the fiber inlet surfaces is achieved by means of a hot-pressing method, with the individual fibers which are arranged in a row at the same time being integrally connected to one another.

All the known concepts have the common feature that the laser beam which emerges from the diode laser bar that has a width of about 10 mm (longitudinal direction of the diode laser bar, slow axis) is optically segmented and geometrically reshaped. However, in order to comply with the requirement for beam quality, this necessarily leads to highly complex solutions which can be technically implemented only with difficulty, and are therefore very expensive.

The optical fibers are in this case arranged with their ends alongside one another in a row. An arrangement such as this can be implemented technically only with a large amount of effort. The described reshaping of the fibers to form a rectangular cross section is likewise technically complex and difficult to manufacture. Furthermore, the described fiber-optic solutions are mechanically highly sensitive and must be handled extremely carefully.

The prior art is in this case based on the linear arrangement of round fibers leading to losses at the beam inlet because of empty spaces between the circular fiber cross sections. Embodiments are therefore described as being particularly advantageous in which the optical fibers have inlet cross sections which are matched to the rectangular geometry of the laser beam which emerges from the diode laser bars.

SUMMARY OF THE INVENTION

It is accordingly an object of the invention to provide a fiber-optic apparatus, which overcomes the above-mentioned disadvantages of the heretofore-known devices and methods of this general type and which provides for a fiber-optic apparatus that can be produced easily and at low cost and with the beam being made symmetrical as efficiently as possible while largely maintaining the beam quality with as little technical effort and financial cost as possible. A further object of the invention is to provide a production method by means of which a fiber-optic apparatus according to the invention can be produced.

With the foregoing and other objects in view there is provided, in accordance with the invention, a fiber-optic apparatus for receiving radiation emitted from a diode laser having at least one diode laser bar with a multiplicity of emitters disposed in at least one row alongside one another relative to a longitudinal axis thereof, the apparatus comprising:

at least one optical fiber bundle associated with the diode laser bar and disposed for injection of a laser beam emitted from the diode laser bar, with each emitter of the plurality of emitters having a multiplicity of optical fibers associated therewith;

said at least one optical fiber bundle having an input side wherein said optical fibers are hot-fused to one another under pressure and without regulation, forming at least one fiber wedge with an inlet surface, and the emitters of the diode laser bar being directly associated with said at least one inlet surface in order to completely receive the laser light emitted from the diode laser bar.

In other words, the invention provides that the optical fibers are hot-fused to one another under pressure and without regulation on the input side in order to form at least one fiber wedge with an inlet surface, and that the emitters of the diode laser bar are directly associated with at least one inlet surface in order to completely receive the laser light emitted from the diode laser bar.

In this case, according to the invention, glass optical fibers (GOF), polymer optical fibers (POF), quartz fibers (QQ) or hard clad silica fibers (HCS) are provided as optical fibers. Optical fibers composed of other materials which carry light are, however, likewise covered by the invention. Glass fibers are used in the preferred embodiments since they can be produced at low cost and are distinguished by good resistance to temperature. It is thus possible to allow high power densities on the inlet surfaces.

A fiber-optic apparatus is therefore advantageously provided which has a flexible optical waveguide. The optical waveguide has at least one inlet surface on the input side, which inlet surface is directly associated with the emitters of a diode laser bar. There is therefore advantageously no need for any additional optical elements for beamforming, as a result of which power losses of the laser light can be avoided, and the heating of the apparatus at the emitter/optical-fiber coupling can be reduced.

At their end of the light inlet side, the optical fibers in this case form a fiber wedge. According to the invention, the inlet surface, associated with the emitters, of the fiber wedge has a smaller cross-sectional area than a cross-sectional area which is closer to the unpressed part of the optical fiber bundle. In the area of the inlet surface associated with the emitters, the height of the fiber wedge is therefore less than in the area in which the optical fibers merge into the unfused part of the optical fiber bundle. This means that the fiber bundle is compressed to a greater extent in the area of the inlet surface than in the transitional area.

The wedge shape can be produced by the pressing process itself, or else by a wedge-shaped sleeve or by appropriately shaped solder-glass elements. The wedge shape is advantageous since this results in less internal stresses occurring in the transitional area of the optical fibers, therefore making it possible to ensure longer life of the individual fibers and of the optical fiber bundle overall.

Where the unfused optical fiber bundle merges into the fused part, the optical fiber bundle would normally be particularly sensitive to the influence of force when a load is applied to it, for example by shear forces. The invention prevents such loads from leading to fracture of optical fibers. In particular, the invention results in a better force gradient under the influence of a force, by means of the wedge-shaped profile on which the optical fibers are compressed to a lesser extent, than if the optical fibers were to be compressed uniformly. The force influences on the optical fibers can thus be absorbed "slowly" thus leading to the apparatus having a better load response overall.

The optical fibers of an inlet surface are hot-fused to one another in a predetermined shape. The shape in this case depends on the respective beam geometry of the laser light which is emitted from the emitters. The direct association of all the emitters in a laser diode bar with an inlet surface preferably results in a rectangular cross-sectional shape of the inlet surface being chosen, whose height and width are matched to the extent of the laser beam on the input plane. The height in this case depends essentially on the acceptance angle of the optical fibers, the number of emitter rows and the emission characteristic of the emitters in the direction of the fast axis. The width depends on the number of emitters within a row and their emission characteristic on the slow axis. Since there is no need for intermediate optical elements, it is possible to choose the distance between the inlet surface and the emitting semiconductor surfaces of the emitters to be short. It is therefore advantageously possible to achieve very small dimensions for the inlet surface height, which, despite everything, takes account of the characteristic of the inlet surface as an assembly of a plurality of optical fibers, and on the other hand ensures optimum light reception.

The optical fibers, which are hot-fused under pressure, have minimal intermediate spaces, so-called gaps, in the assembly of an inlet surface, as a result of which the laser light which is emitted from the emitters of the laser diode bar can be injected into the optical waveguide with virtually no losses. This means that it is possible to avoid the optical fiber bundle being heated when laser light is injected, and thus having to have complex cooling during use of the apparatus. Such heating occurs in known apparatus from the prior art in particular when the optical fibers are adhesively bonded, since the adhesive compound in the boundary surfaces absorbs a considerable amount of light energy from the laser light, and is thus heated.

The apparatus according to the invention also provides for the optical fibers which form an inlet surface to be arranged on the input side in a sleeve, preferably hot-fused, adhesively bonded in a high temperature-resistant manner to a sleeve composed of glass or ceramic, or in a sleeve composed of metal, are fused in by means of a solder glass, adhesively bonded in an interlocking high temperature-resistant manner, and in an interlocking manner, subjected to compression stress are clamped upright, pressed, and adhesively bonded in a high temperature-resistant manner.

This embodiment variant avoids the need for complex adjustment of the inlet surface on the emitter arrangement, as is normally required in the case of known apparatuses for the very reason that the laser light should not strike boundary surfaces or existing adhesive areas, because of the heating associated with this. The sleeve ensures permanent and robust attachment of the inlet surface to or in front of the laser diode bar and, in addition, a firm connection of the optical fibers of an inlet surface after hot-fusing. Different sleeve materials and sleeve geometries are provided in this case. Furthermore, the compressive stress which is deliberately applied by the sleeve to the fused glass fiber bundle counteracts cracks resulting from internal stresses in the fused glass fiber bundle.

It is advantageously also possible to supply the laser light directly through the optical fibers of the optical waveguide for beam forming and beam guidance. In this case, the laser light from a plurality of laser diode bars can be joined together in a simple manner, and can be emitted in any desired form at the end of the optical waveguide. This does not depend either on the arrangement of the laser diode bars or on that of the emitters of each laser diode bar of the diode laser.

Since, in the case of typical laser diode bars, approximately 19 emitters are arranged alongside one another, the laser light which is produced by the diode laser bar is emitted at the light outlet in a narrow virtually rectangular laser beam with a width of about 10 mm and a height of 1 μm. The invention provides for this highly asymmetric beam geometry to be adapted for the respectively intended applications, in which case beam forming can be carried out without any problems on the outlet side for the required beam geometry. For example, square or round shapes are possible, or else beam forms in the shape of bars or waves, and/or other adapted beam forms. These beamforms can be produced in a simple manner by appropriate arrangement of the optical fibers at the output of the optical waveguide, or by combination with appropriate coupling pieces.

It is advantageous that the reduction in the height of the fiber bundle allows compression to about 75% of its original volume, thus minimizing or entirely avoiding the intermediate spaces which were present in the initial bundle. The wedge-shaped volume reduction of the fiber bundle is achieved within the sleeve. The angle and the dimensions of the wedge shape are predetermined by the design configuration of the internal contour of the sleeve.

The wedge shape can be achieved by means of a reshaping process using a wedge-shaped reshaping tool. As an alternative to this, it has been found to be advantageous to achieve the reshaping by wedge-shaped pressing of a solder glass between the sleeve wall and the fiber bundle.

Since the transitional zone between the fused and unfused fibers composed of glass may be mechanically highly unstable because of thermal stresses, and the fused fiber bundle has a tendency to fracture or crack formation under the influence of external loads, it is particularly advantageous for this transitional zone to be arranged completely within the surrounding sleeve. The optical fiber bundle according to the invention is thus advantageously well protected against external influences.

In this case, for certain applications, it has been found to be advantageous for the sleeve to be composed of at least two sleeve parts, and for it to be possible for the sleeve parts to be fitted to one another by means of a joining method, preferably by screwing, latching, riveting, welding or adhesive bonding.

A further advantage of the apparatus according to the invention is that, as a result of its arrangement without any control during the hot-fusion process, the optical fibers can be used without previous prior deformation. The invention provides for the optical fibers in the optical fiber bundle to have a structure with very dense packing, preferably a structure with hexagonally very dense packing, in the cross section on the input side. During the hot-fusion process under pressure, the optical fibers are provided with a shape with very dense packing. The inlet surface in the preferred embodiment has, in cross section, a structure with hexagonally very dense packing. This structure has also been found to be particularly advantageous for loss-free reception of the laser light. In this case, it is advantageous that this structure can be produced easily and without any additional hardware complexity, thus making it possible to produce an apparatus which is optimally matched to the optical conditions, without any additional costs. Furthermore, it is thus noticeable in terms of cost-effectiveness in an advantageous manner in the case of the apparatus according to the invention that it is likewise possible to dispense with a predetermined arrangement of the optical fibers and with a predetermined shape thereof. In particular, the optical fibers are not arranged in a linear form in a row, thus avoiding considerable adaptation and setting-up effort. Finally, it is also advantageous that the fiber-optic apparatus according to the invention is mechanically robust and can therefore be used for a wide range of operational purposes.

One development of the invention is achieved in that the laser light of the laser diode bar can be injected into more than one optical fiber bundle and can be guided to at least one application location. It is therefore possible to associate a predetermined number of emitters in the laser diode bar with one or more optical fiber bundles, thus allowing the radiation of a plurality of diode laser bars to be combined without major effort in order to obtain an adequate radiation intensity at the application point. It is also possible to pass the laser light, corresponding to its association, into the optical fiber bundles to a common application location or to a plurality of application locations which are spatially separated from one another. In this case, it is advantageous that the apparatus can therefore be used in a versatile manner, in which case the laser light can be optimally shaped by arranging the optical fiber bundles at the outlet-side end of the optical waveguide. It is therefore also possible to mix relatively weakly illuminated optical fibers with more strongly illuminated optical fibers, as a result of which the emerging light has a homogenous light distribution over the outlet surface. It is also advantageously possible to vary the beam path of the laser light of the optical fiber bundles at the application location by means of additional optical elements. This allows efficient utilization of the light power of the diode laser for the desired application. In this case, the laser light can be focussed, collimated, diverged or can be varied in some other manner for illumination of a larger or a smaller area than the light outlet surface, at the output of one or more optical fiber bundles, corresponding to the intended application location, to the topography of the application location relating to this, or the desired type of application. Association of the radiation of a diode laser bar with a plurality of optical fiber bundles also allows this radiation to be applied to a plurality of spatially separate application locations.

One development of the apparatus according to the invention is achieved in that the optical fiber bundles are held in a flexible optical cable. The apparatus provided in this way ensures that the diode laser bars need not be used directly at the application location. In fact, beam guidance is achieved, in which the heat development and the cooling of the diode laser bars which thus becomes necessary can be arranged at a sufficient distance from the application without in the process having to dispense with the required flexibility. Particularly in the case of operational purposes in which the application location must be spatially varied during use, the guaranteed highly flexible beam guidance is used optimally. The transmitted radiation can be adapted by means of the flexible optical cable that is provided to virtually any distance and without restrictions to any desired spatial conditions and can correspondingly be used with virtually no losses on the outlet side. Flexible beam guidance such as this is particularly advantageous for laser radiation, and is not ensured by the capabilities of the known prior art.

Furthermore, according to the invention, the optical fiber bundles are held in a flexible optical cable. The optical fiber bundles themselves comprise several hundred to several thousand individual fibers with a small diameter. These may be arranged individually or in groups, with a fiber arrangement which is best for the respective application being provided at the outlet-side end of the optical fiber bundle.

One preferred embodiment of the apparatus according to the invention is provided in that at least one additional line is provided in the optical cable for mechanical, electrical, pneumatic and/or hydraulic means, preferably for the arrangement of strain-relief elements, power cables, flexible tubes for air and/or cooling liquid. This allows an optimum spatial arrangement of additional so-called supply and disposal elements of specific application purposes in one cable, and, furthermore, an increase in the robustness of the optical cable without significantly restricting the mobility at the outlet end of the optical waveguide.

A further preferred embodiment of the apparatus according to the invention is provided in that the optical cable has an outer, preferably dust-tight sheath. The arrangement of the individual optical fiber bundles can in this way be optimally protected against external mechanical influences and dirt. This also means that the apparatus can be cleaned easily and at low cost after use. The sheath is also provided in order to hold together the optical fibers and further elements according to the invention.

In this case, the invention also provides that the optical cable is filled with a thermoplastic filling material, in which the optical fiber bundles, lines and/or strain-relief elements are held. The individual optical fiber bundles and additional elements in the optical cables are thus advantageously kept at a distance from one another, thus making it possible to avoid mutual mechanical influences. Furthermore, on the outside, the filling improves the protection against damage.

An optimum configuration of the optical waveguide is achieved in that the optical fiber bundles are themselves each surrounded by a primary sheath. The optical fiber bundles therefore do not become unraveled, thus avoiding damage to the optical fibers during production and subsequent use of the apparatus.

One particularly preferred embodiment which can be produced easily is provided in that the sheaths comprise prefabricated and/or in-line-extruded flexible tubes. In this case, it has been found to be advantageous for the sheaths to be composed of thermoplastic, preferably extrudable, plastics, or of an elastomer which can be vulcanized. This results in an apparatus in which the sheaths of the glass fiber bundles or of the optical waveguide can not only be prefabricated but can also be extruded in-line into the material during production. According to the invention, PVC, thermoplastic polyurethanes, thermoplastic elastomers, silicone rubbers and the like are provided as the material.

One preferred embodiment is provided in that the optical fiber bundles as well as individual additional elements or all of the additional elements are extruded in-line into the material during their production, while these individual cables are drawn with the filling material into a prefabricated flexible tube. It is thus possible, if required, to maintain the optical waveguide over the course of its life, to replace individual elements in the optical waveguide, or to add to them. This embodiment also means that it is advantageously possible to produce any desired versions of optical waveguides inline for different applications. This means that the number or choice of optical fiber bundles and additional elements in successive optical waveguides can be varied during production without particular additional interruptions.

One particularly advantageous embodiment of the apparatus is achieved by the optical fiber bundle having a diameter in the range of $d \leq 8$ mm, preferably between 2 and 5 mm. In this case, it has been found to be particularly advantageous for the optical fiber bundles to have individual fibers, and for the individual fibers to have a diameter of between 30 μm and 100 μm.

For optimum injection of the laser light into the optical waveguide, the invention provides for the numerical aperture of the fibers used to be in the range between $NA=0.10$ and $NA=0.87$, preferably $NA=0.66$. This ensures optimum optical conditions for the inlet surface on the optical fiber bundle, as required for advantageous laser light injection. Provision is also made in this case for the acceptance angle to be greater than or equal to the beam angle of the radiation emitted on the "fast axis" from the diode laser bar. This additionally avoids power losses occurring when the laser light is injected into the inlet surface, and in this case the available light can be injected substantially completely into the optical waveguide.

One advantageous embodiment has been found in which the optical fiber bundle has a diameter of $d=2.8$ mm and comprises about 1300 individual fibers with a diameter of 70 μm. Furthermore, according to the invention, the optical fibers in an optical fiber bundle are adhesively bonded by means of a high-temperature adhesive in the sleeve composed of glass, ceramic and/or metal before the hot-pressing process. This allows optimum matching to the geometry of the laser diode bar, and therefore to the beam geometry of the diode laser. In this case, it has been found to be particularly advantageous for the adhesive to be an epoxy resin, polysilazane or ceramic adhesive. In this case, the invention includes the use of $TiO_2$ or other inorganic filling material for the resins that are used. The advantages of this combination are, in particular, the increased temperature resistance, a better reflection degree and a reduced penetration depth of the laser radiation into the adhesive material.

Advantageous optical waveguides according to the invention are provided by the optical fiber bundle having a width of about 10-12 mm and a height of about 0.2-0.7 mm on the inlet surface.

With the above and other objects in view there is also provided, in accordance with the invention, a method for producing a fiber-optic apparatus. The method comprises the following steps:
  cleaning of the metallic or glass sleeve of greasy or oily residues of the prior processing;
  introduction of the fiber bundle into the sleeve;
  heating of the sleeve until the softening point of the optical fibers is reached;
  hot-pressing of the sleeve, with force being applied to the sleeve by the pressing tools.

Alternatively or additionally, the invention provides that the sleeve is coated internally and/or externally with a high-temperature separating means. Good heating of the optical fibers is advantageously achieved in that the sleeve is heated by means of pressing tools which can be heated inductively to about 450° to 750° C. Furthermore, the invention has advantageously identified the fact that the sleeve height is reduced by means of pressing tools, preferably over the entire width and over a length of preferably about 10-15 mm.

In this case, the invention provides on the one hand that the sleeve is a tubular section. In this case, it has been found to be advantageous that the optical fiber bundle is spread out to form a multilayer fiber strip, and is then pushed into the sleeve.

Furthermore, according to the invention, a thermoformed sleeve is also used. In this case, the optical fiber bundle is inserted as a wound bundle into the sleeve, and the internal shape of the sleeve is reshaped appropriately during the pressing process.

According to the invention, the use of a multipart sleeve, preferably with an upper part and a lower part, is proposed in that the optical fiber bundle is reshaped into a multilayer fiber strip, is then inserted into a sleeve part and the sleeve is closed before or after the pressing process by fitting and joining the corresponding sleeve part, preferably by latching, screwing, soldering, welding or riveting.

It has been found to be particularly expedient that the sleeve to be reshaped is fixed in a holder and the preheated pressing tool is then pressed on in the axial direction, that the pressing tool has a slot which tapers in the form of a wedge and by means of which the sleeve is reshaped in the form of a wedge.

One advantageous variant of the method provides that a solder glass section is pressed in between the heated sleeve and the optical fiber bundle which has been inserted into the sleeve, and in that an additional radial force is exerted on the softening fibers during the pressing process, by means of which the fibers are shaped hexagonally, with no intermediate spaces between them.

The invention provides that the sleeve or the solder glass section may have different shapes. Rectangular, oval or hexagonal shapes have been found to be advantageous for the sleeve and for the solder glass section. However, the invention also covers any other suitable shapes.

The invention advantageously results in radiation which is emitted from one or more diode laser bars being largely completely received. The inlet surfaces of the optical fiber bundles are matched to the shape of the radiation emitted from diode laser bars, with the optical fiber bundles being hot-fused for this purpose, and being adhesively bonded in a high temperature-resistant manner in a sleeve. The laser radiation can therefore be guided with low losses to the application location, and can be used there with good handling of the optical waveguide. The latter is highly flexible, so that the outlet end is freely movable. The laser radiation can be provided in virtually any geometric shape at the outlet end of the optical waveguide.

Optional additional elements in the optical cable, for example for voltage supply, control of switching processes and sensors, and for transport of cooling liquids, can easily be arranged alongside the optical fiber bundles, without significantly restricting the mobility of the optical waveguide. One or more strain-relief elements in the optical fiber cable also improve its handling capability. Furthermore, the apparatus can be batch-produced easily, at low cost and in large quantities with the production methods according to the invention. It is likewise possible to dispense with complex adjusting processes during production, and the use of additional optical elements, which would make the apparatus considerably more sensitive to mechanical influences. In particular, it is possible to dispense with the fast axis collimator lenses (FAC lenses) which are frequently used for diode laser bars in the prior art.

Other features which are considered as characteristic for the invention are set forth in the appended claims.

Although the invention is illustrated and described herein as embodied in a fiber-optic apparatus for receiving the emitted radiation of a diode laser, and a method for producing such an apparatus, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
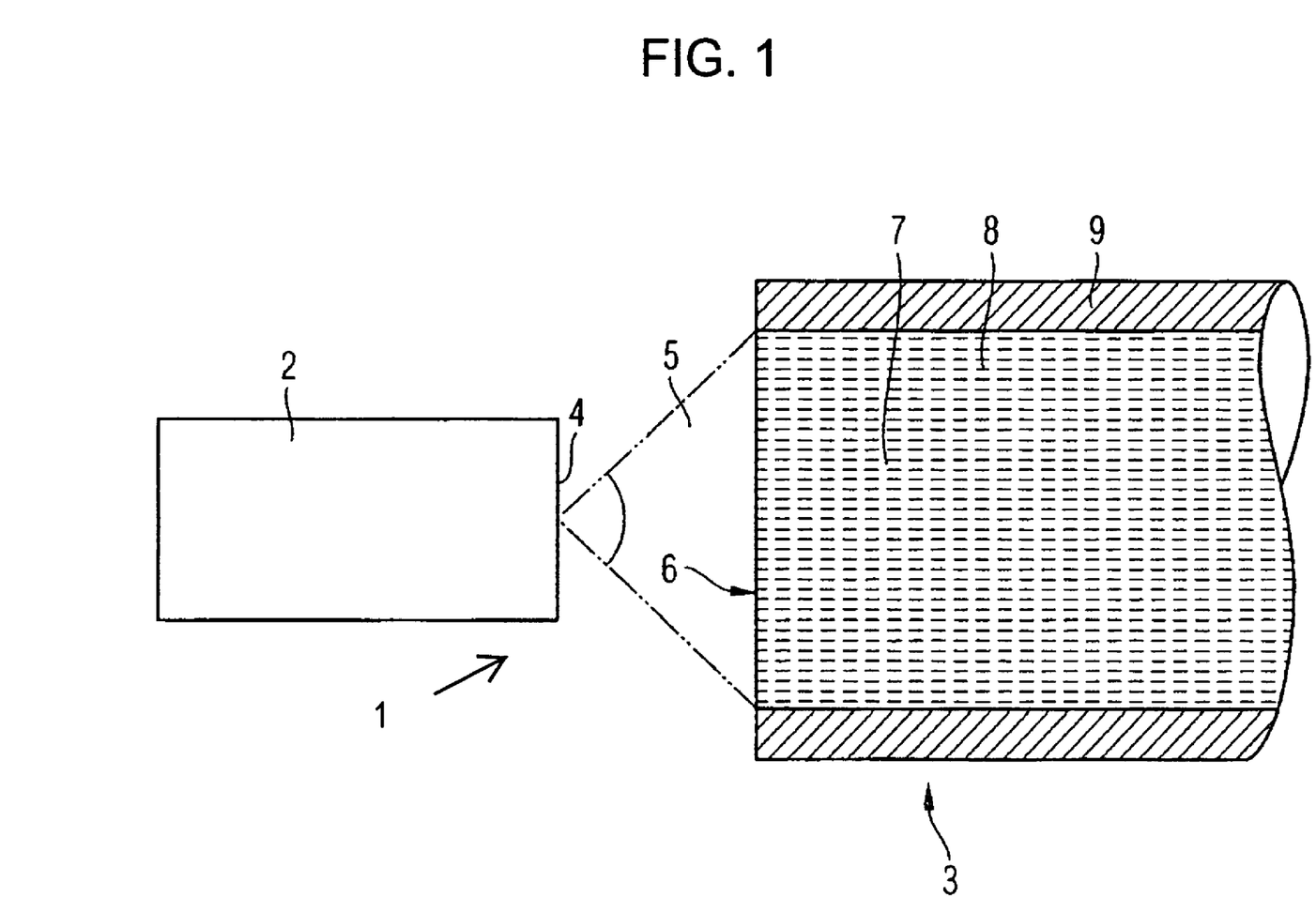
FIG. 1 is a schematic side view in cross-section of a diode laser bar with an optical waveguide.

Referring now to the figures of the drawing in detail and first, particularly, to FIG. 1 thereof, there is shown, in a schematic side view, the apparatus 1 with a diode laser bar 2 and an optical waveguide 3 positioned opposite it. The illustration shows the arrangement in the form of a cross section. In this case, the laser light 5 which is emitted from the emitters 4 of the diode laser bar 2 is injected onto a rectangular inlet surface 6.

The inlet surface 6 is formed at the input-side end of the optical fiber bundle 7 by the individual optical fibers 8 which are arranged in a sleeve 9. The optical fiber bundle 7 is associated with the inlet surface 6, the laser diode bar 2 and with the emitters 4 such that the beam geometry of the laser light 5 largely completely illuminates the inlet surface 6.

The optical fiber bundle 7 has optical fibers 8 which are hot-fused to one another, were inserted into the sleeve 9 before the hot-pressing process and were then pressed with the sleeve 9. At the end opposite the emitters 4, the sleeve 9 is thus shaped into a rectangular slot shape. According to the invention, brass sleeves are used for this purpose. Embodiments of such sleeves 9 according to the invention are described, for example, in FIGS. 3A-3F.

The optical fiber bundle 7 shaped in this way accordingly has optical fibers 8 which are integrally connected to one another and are adhesively bonded (e.g., glued) in the sleeve 9 by means of a high-temperature adhesive. In this case, suitable adhesives are proposed from the group of titanium-oxide-filled polysilazanes. Other suitable adhesives are likewise covered by the invention.

In the illustrated embodiment, the cross-sectional area of the rectangular slot in the sleeve 9 is reduced during the hot-shaping process to about 75% of the initial area, as a result of which the optical fibers 8 are fused to one another in an interlocking manner. In this case, the fibers are packed very densely, preferably in the form of hexagonal packing. The empty spaces between the originally round optical fibers are in this case virtually completely eliminated. While cooling down, the sleeve 9 shrinks further onto the optical fiber bundle 7 which has been fused in this way, and fixes the optical fiber bundle 7 within the sleeve 9.

The slot geometry according to the invention of an optical fiber bundle 7 which has been hot-fused in this manner is chosen to be in the region of about 12 mm in width and 0.2-0.7 mm in height. The advantages of such prefabrication are that the inlet surface 6 has extremely good temperature resistance of the hot-fused glass fibers. The inlet surface 6 has no significant absorbent intermediate spaces between the glass fibers 8.

The invention makes it possible to dispense with a defined arrangement of the optical fibers, and in particular avoids the optical fibers being arranged in a row, which is complex from the production-engineering point of view, as described in the prior art.

The laser radiation which is emitted from the emitters 4 with an angle of 60° is received by means of a multiplicity of image optical fibers 8, with the radiation surface having a height of about 1 µm on the fast axis, by the inlet surface 6 on the input-side slot of the sleeve 9 with its slot height of 0.2-0.7 mm. Each optical fiber 8 thus transmits only a corresponding proportion of the total radiation power of the laser diode bar 2 and of the emitter 4. The optical fibers 8 therefore do not need to be specially protected against fiber fracture, for example by means of an additional coating. In addition, low-cost multicomponent glass fiber bundles with normal fracture rates of 3-5% can be used. In consequence, the apparatus 1 can be provided at a considerably lower cost than would be possible in the case of preshaped or preformed optical fibers of the prior art and optical fiber bundles composed thereof.

Because of the sufficiently large slot height of the sleeve and the multiplicity of optical fibers 8 on the input plane of the inlet surface 6, the apparatus 1 can be adjusted to be at a comparatively long distance in front of the outlet surface of the emitters 4. This makes it possible to completely dispense with collimating optics, so-called FAC lenses, thus reducing the production costs considerably further.

This simplifies the manufacture of the apparatus 1 according to the invention. Furthermore, the apparatus 1 can be manufactured in a manner which can be automated well. The apparatus 1 can therefore be batch-produced in large quantities.

Figure 2A:
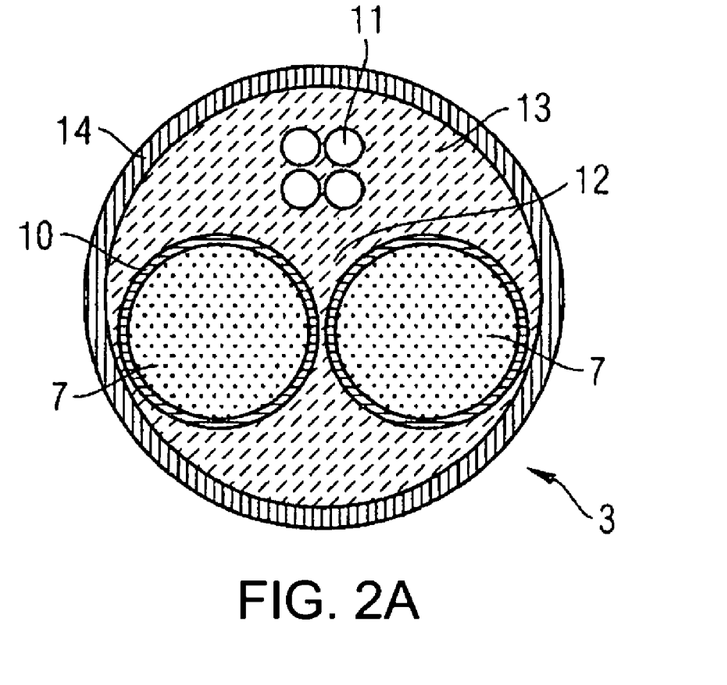
FIG. 2A is a cross-sectional view of an optical cable in a round implementation.
Figure 2B:
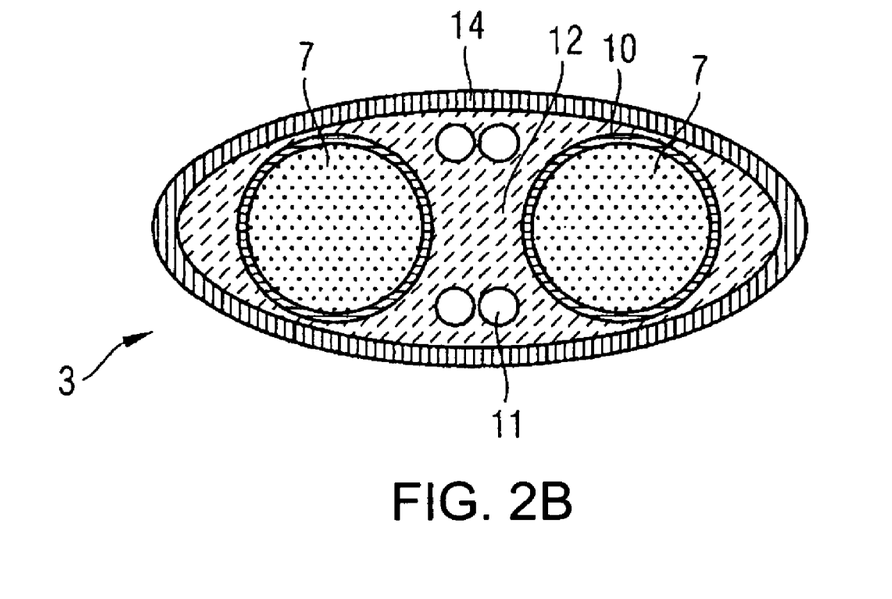
FIG. 2B is a cross-sectional view of an optical cable in an oval implementation.

FIG. 2A shows a cross-sectional view of a round version of an optical cable 3, and FIG. 2B shows an oval version of a corresponding optical cable 3. In this case, the optical fiber bundles 7 are arranged alongside one another. In addition to the optical fiber bundles 7, the optical cables 3 have additional elements 11 and 12. In the illustrated embodiments, these are electrical cables 11 and strain-relief cables 12. Furthermore, the invention likewise covers supply and disposal cables or elements for this purpose, which are not illustrated here.

The optical fiber bundles 7 and the elements 11 and 12 are each held in their own right in a sheath 10 and, furthermore, are protected by a filling compound 13 of an outer sheath 14. In this case, the arrangement of the optical fiber bundles 7 and of the elements 11 and 12 is chosen on the basis of the use of the apparatus and the characteristics required in this case of the optical cable 3. The two embodiments of the optical cable shown here are in this case only exemplary. In addition to the round and oval versions the invention likewise covers the configuration as a flat-ribbon cable, and other shapes. In this case, the shape can advantageously be varied over the length of the optical cable 3 thus making it possible to produce bending and moving zones in the optical waveguide.

The fiber-optic cable 3 thus comprises an outer, dust-tight sheath in which a number of optical fiber bundles 7 are arranged, depending on the number of laser diode bars 2 to be attached. These optical fiber bundles 7 are themselves each surrounded by a primary sheath 10. Both the primary sheath 10 and the outer sheath 14 may be produced from prefabricated flexible tubes into which the optical fiber bundles 7 and the additional elements 11 and 12 can be pulled.

It has been found to be particularly advantageous and cost-effective to produce the sheaths 10, 14 from a thermoplastic which is first of all extruded around the optical fiber bundles, with the primary cables produced in this way being extruded in a second step into a common, outer sheath, which is likewise composed of a thermoplastic. The additional elements 11, 12 can thus also be held in the optical cable 3, in addition to the optical fiber bundles 7.

The additional elements 11, 12 include, inter alia, electrical cables for an electrical voltage supply for switching and monitoring means, flexible lines for coolant transmission and strain-relief elements. Any remaining cavities are generally filled with the thermoplastic filling material.

The size of the optical fiber bundles 7 used depends on the desired inlet surface 6. Optical fiber bundles 7 with diameters from 2 to 5 mm are used. Corresponding to the optical fiber bundle diameter, these are composed of several hundred up to several thousand individual optical fibers 8 with diameters of between 30 µm and 100 µm. The acceptance angle of the optical fibers 7 used for light in the application wavelength range of a diode laser is between 30° and 110°, and is greater than or equal to the beam angle of the radiation emitted on the fast axis by the diode laser bar 2. This ensures that all of the emitted radiation is transmitted through the optical waveguide 3.

In the illustrated embodiment, the described primary optical fiber bundle 7 has a diameter of about 2.8 mm, and comprises about 1100 individual optical fibers 8 with a diameter of 70 µm. The numerical aperture of the optical fibers used is NA=0.66, which corresponds to an acceptance angle of 80°.

Figure 3A:
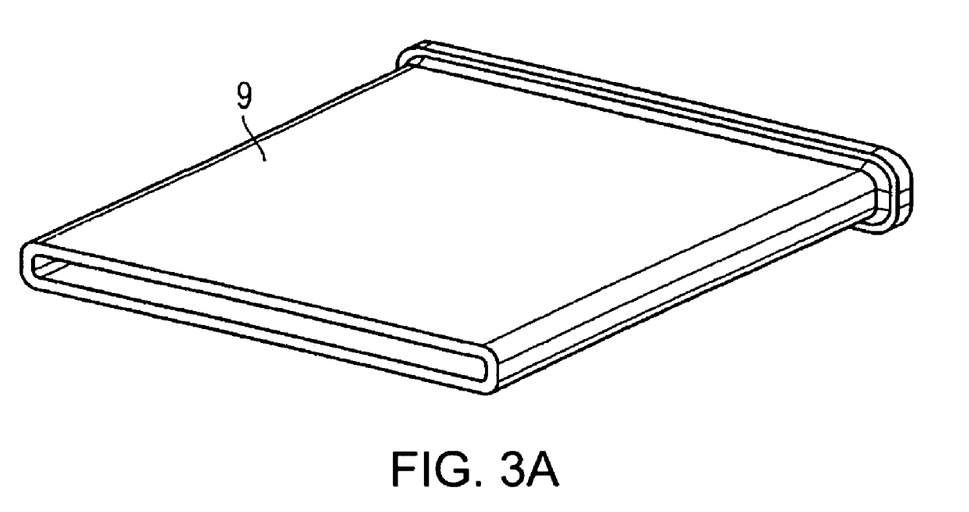
FIG. 3A is a perspective view of an exemplary sleeve formed as a tube section.
Figure 3B:
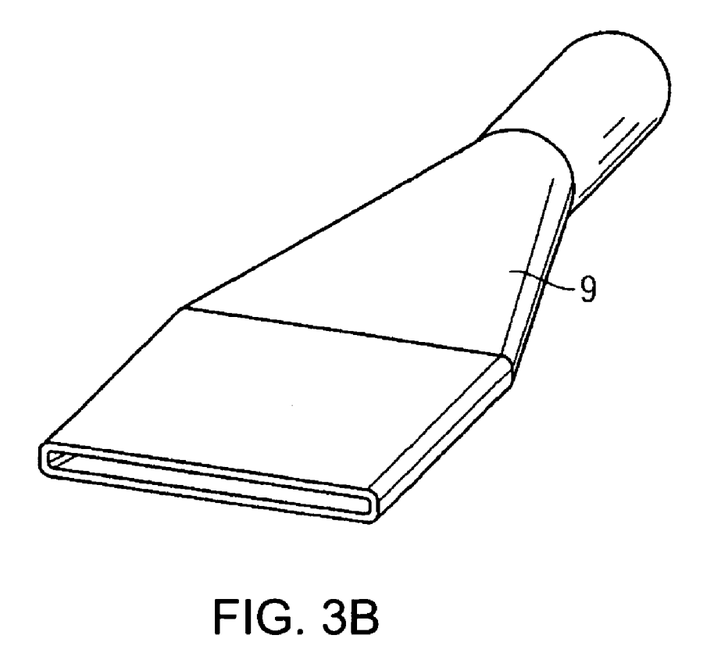
FIGS. 3B and 3C a similar views of a sleeve formed as a thermoformed part.
Figure 3C:
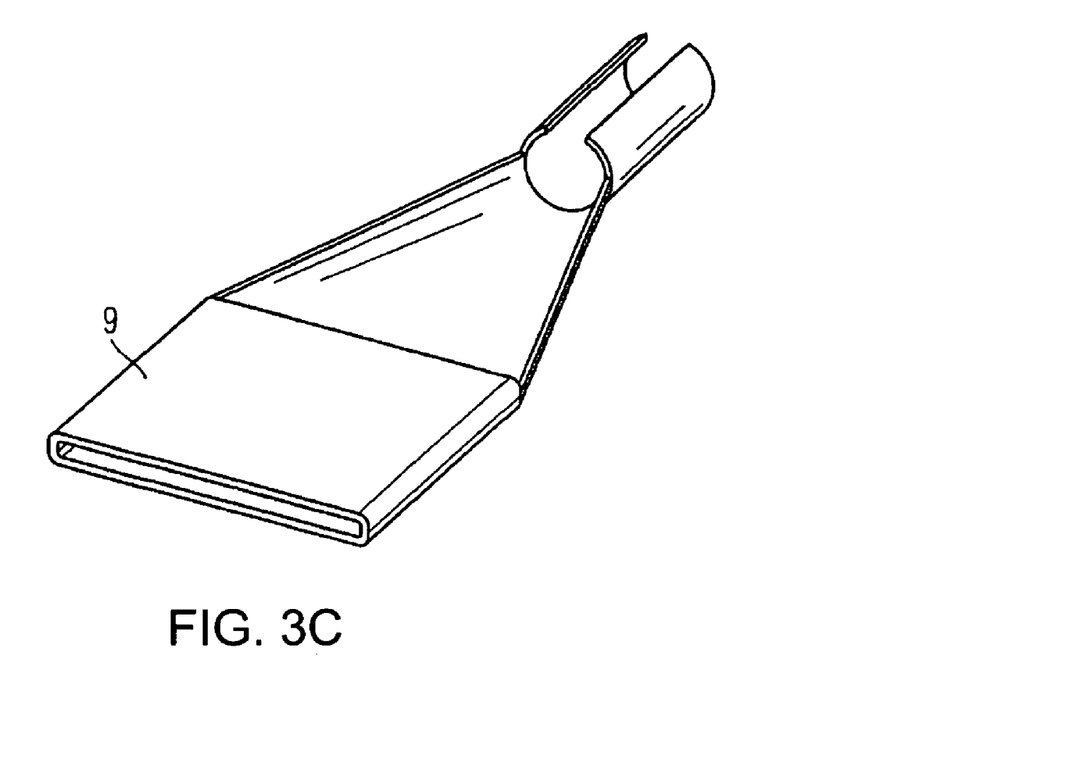
Figure 3D:
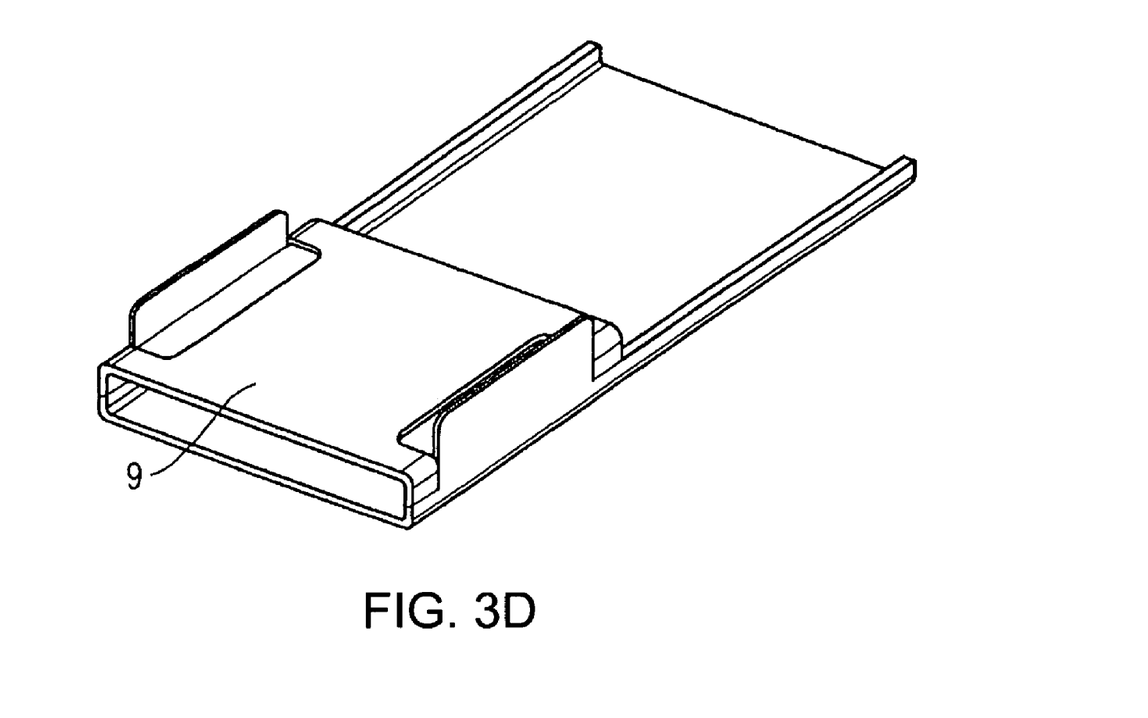
FIGS. 3D, 3E, and 3F are similar views of a sleeve formed as a stamped part.
Figure 3E:
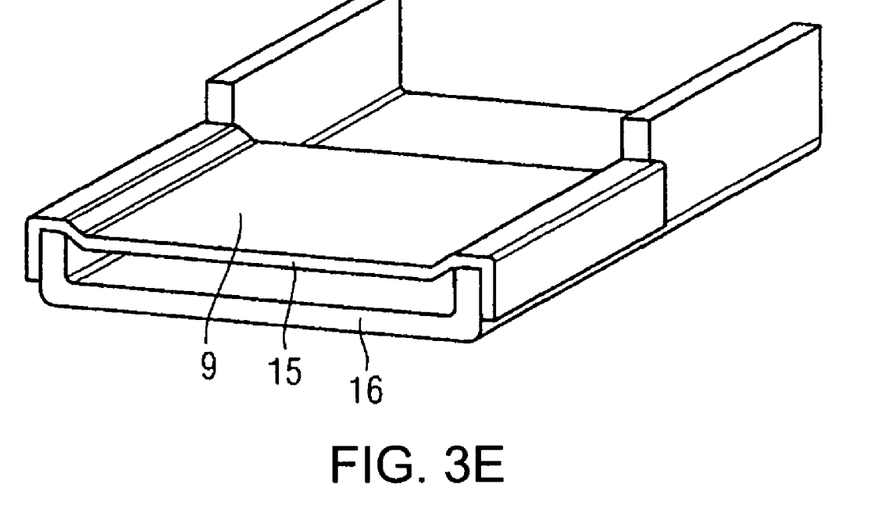
Figure 3F:
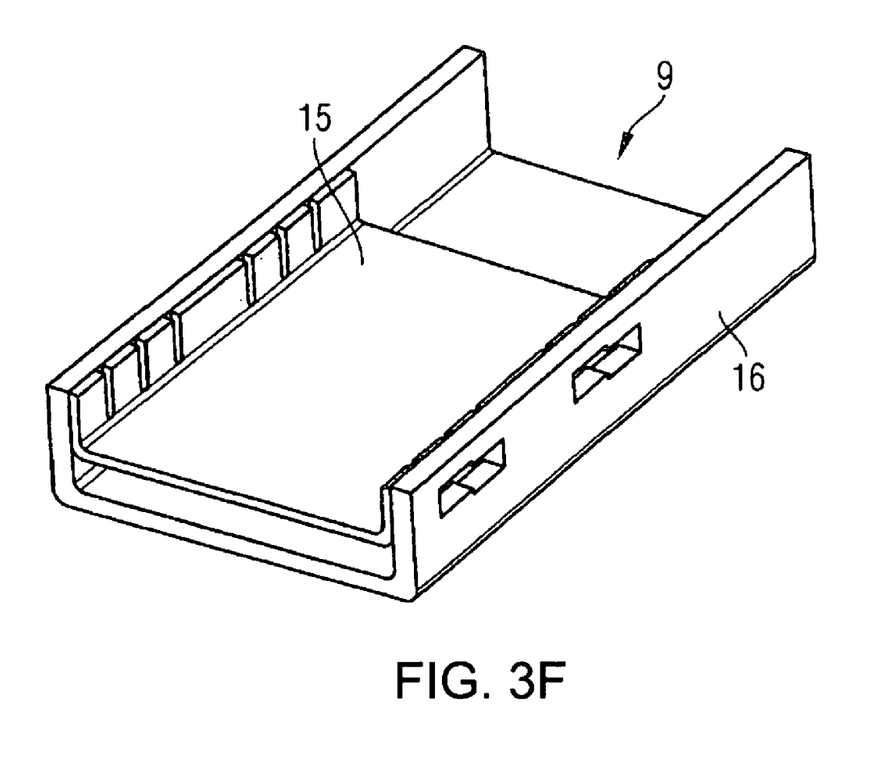

FIGS. 3A-3F illustrate various sleeves which are provided according to the invention for the inlet surface 6. FIG. 3A shows a sleeve 9 as a tubular section. The optical fibers 8 of an optical fiber bundle 7 are in this case joined together and inserted into the sleeve 9. The sleeve 9 with the optical fibers 8 is then heated and compressed. FIG. 3B shows the sleeve 9 as a thermoformed part, manufactured as shown in FIG. 3A. FIG. 3C likewise shows a sleeve 9 as a thermoformed part. FIGS. 3D, 3E and 3F show sleeves 9 as a stamped part, with the optical fibers being inserted into the sleeves in these embodiments. While, in the case of the sleeve 9 as shown in FIG. 3C, the optical fiber bundle 7 is reduced at the inlet surface 6 as described above, the other embodiments are in two parts, with an upper part 15 and a lower part 16. During the production of the inlet surface 6 for the laser beam, the individual optical fibers 8, which have already been inserted into the lower part 16, are locked to the upper part 15, and the upper part 15 and lower part 16 with the optical fibers between them are heated and compressed. As in the case of the sleeves 9 described above, this results in the cross sections of the optical fiber bundles 7 being reduced by about 25%.

Figure 4A:
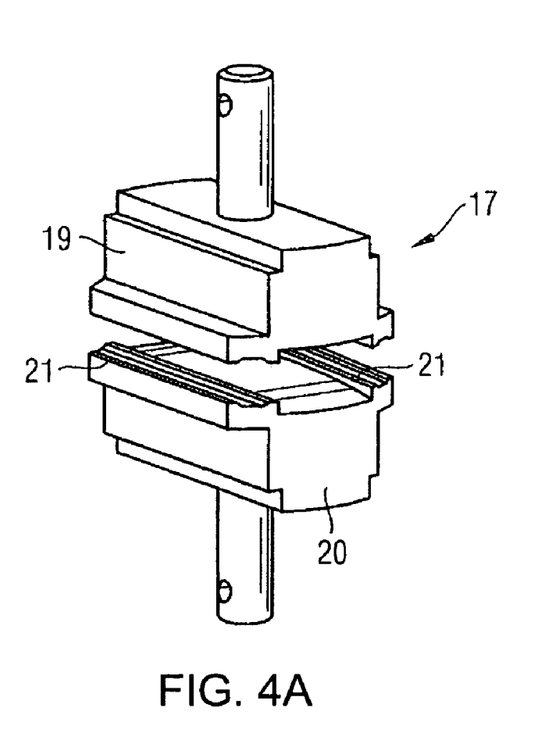
FIG. 4A is a perspective view of a pressing tool for the production method for two-part sleeves.
Figure 4B:
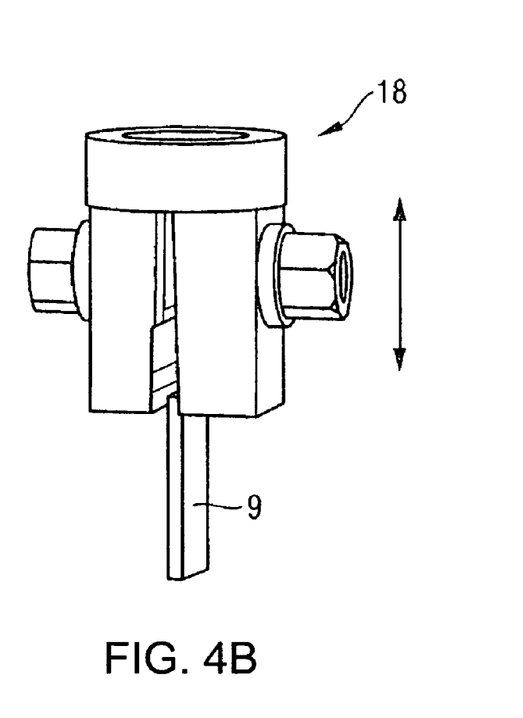
FIG. 4B is a perspective view of a pressing tool for the production method for integral sleeves.

FIGS. 4A and 4B show appropriate pressing tools 17, 18 for the compression of the various sleeves 9. In this case, FIG.

4A shows a pressing tool 17 for two-part sleeves 9. The pressing tool 17 has a pressing mold upper part 19 and a pressing mold lower part 20, which can be moved with respect to one another and can press the inserted sleeves 9 together, under the influence of force. For this purpose, spacers which are not shown in the figure are inserted at the insertion points 21. During the pressing process, the sleeves 9 are therefore provided with a shape which depends on the height of the inserted spacers.

FIG. 4B shows a corresponding pressing tool 18 for integral sleeves 9. The fiber-optic apparatus 1 is accordingly produced in that the metallic or glazed sleeve 9 is first of all cleaned of greasy or oily residues from the prior processing and is then coated internally and externally with a high-temperature separating means, preferably with boron nitride. The optical fiber bundle 7 is introduced or inserted into the sleeve 9 that has been prepared in this way. The sleeve 9 is then heated, with the optical fibers 8. This heating of the sleeve 9 is preferably carried out by means of inductively produced heat to a temperature of about 750° C. The heating means required for this purpose may be integrated in the pressing tool, or may be arranged separately.

After the heating process, the sleeve 9 and optical fibers 8 are hot-pressed by the pressing tool 17, 18 with force being applied to the sleeve, during which process the optical fibers 8 are fused to one another. This results in the sleeve height being reduced by means of the pressing tools 17, 18, preferably over the entire width and over a length of preferably about 10-15 mm.

In the case of sleeves 9 which are in the form of a tubular section, the optical fiber bundle 7 is spread out to form a multilayer fiber strip and is then pushed into the sleeve 9. In the case of sleeves 9 which are in the form of thermoformed sleeves, the optical fiber bundle 7 is inserted as a round bundle into the sleeve 9, and the internal shape of the sleeve is appropriately reshaped during the pressing process. In the case of sleeves 9 which are in the form of two-part sleeves 9 with an upper part 15 and a lower part 16, the optical fiber bundle 7 is reshaped to form a multilayer fiber strip, is then inserted into the sleeve lower part 15, and the sleeve 9 is closed before the pressing process, by fitting and latching the sleeve upper part 16 to the sleeve lower part 15.

The rectangular sleeve to be reshaped is then fixed in a holder, and the preheated pressing tool is pressed on in the axial direction. In this case, the pressing tool has a slot which tapers in the form of a wedge, and by means of which the rectangular sleeve 9 is reshaped to produce a wedge shape.

For production, it has been found to be advantageous for a rectangular soldered glass section to be pressed in between the heated sleeve 9 and the optical fiber bundle 7 which has been inserted into the sleeve 9, and for an additional radial force to be exerted on the softening optical fibers 8 during the pressing process, by means of which the optical fibers 8 are shaped hexagonally and are thus arranged adjacent to one another without any intermediate spaces.

The invention claimed is:

1. A fiber-optic apparatus for receiving radiation emitted from a diode laser having at least one diode laser bar with a multiplicity of emitters disposed in at least one row alongside one another relative to a longitudinal axis thereof, the apparatus comprising:

at least one optical fiber bundle associated with the diode laser bar and disposed for injection of a laser beam emitted from the diode laser bar, with each emitter of the plurality of emitters having a multiplicity of optical fibers associated therewith;

said at least one optical fiber bundle having an input side wherein said optical fibers are hot-fused to one another under pressure and without regulation, forming at least one fiber wedge with an inlet surface, and the emitters of the diode laser bar being directly associated with said at least one inlet surface in order to completely receive the laser light emitted from the diode laser bar.

2. The fiber-optic apparatus according to claim 1, which further comprises a sleeve enclosing said optical fibers forming said inlet surface on the input side.

3. The fiber-optic apparatus according to claim 2, wherein said sleeve is formed of glass or ceramic and said optical fibers are hot-fused, adhesively bonded in a high temperature-resistant manner to said sleeve.

4. The fiber-optic apparatus according to claim 2, wherein said sleeve is composed of metal and said optical fibers are fused in by a solder glass, adhesively bonded in an interlocking high temperature-resistant manner, and, in an interlocking manner, subjected to compression stress are clamped upright, pressed, and adhesively bonded in a high temperature-resistant manner.

5. The fiber-optic apparatus according to claim 1, wherein said sleeve is composed of at least two sleeve parts, and said sleeve parts are configured for fitting to one another by a joining method.

6. The fiber-optic apparatus according to claim 5, wherein said sleeve parts are configured for screwing, latching, riveting, welding, or adhesive bonding.

7. The fiber-optic apparatus according to claim 1, wherein said optical fibers in said optical fiber bundle are structured with very dense packing.

8. The fiber-optic apparatus according to claim 7, wherein said optical fibers in said optical fiber bundle have a hexagonal shape for the very dense packing, in a cross section on the input side.

9. The fiber-optic apparatus according to claim 1, wherein the laser light of the laser diode bar is injectible into more than one optical fiber bundle and the laser light can be guided to at least one processing location.

10. The fiber-optic apparatus according to claim 9, wherein a beam path of the laser light of the optical fiber bundles is variable at the processing location by means of additional optical elements.

11. The fiber-optic apparatus according to claim 1, which comprises a flexible optical cable containing said optical fiber bundles.

12. The fiber-optic apparatus according to claim 11, which comprises at least one additional line in said optical cable for at least one of mechanical, electrical, pneumatic, and hydraulic means.

13. The fiber-optic apparatus according to claim 12, wherein said additional line in said optical cable is configured for one or more of strain-relief elements, power cables, flexible tubes for air, and cooling liquid.

14. The fiber-optic apparatus according to claim 11, wherein said optical cable includes an outer dust-tight sheath.

15. The fiber-optic apparatus according to claim 11, wherein said optical cable is filled with a thermoplastic filling material holding said optical fiber bundles, lines, and/or strain-relief elements.

16. The fiber-optic apparatus according to claim 11, wherein each of said optical fiber bundles is surrounded by a primary sheath.

17. The fiber-optic apparatus according to claim 16, wherein said sheaths are one of a prefabricated flexible tube or an inline-extruded flexible tube.

18. The fiber-optic apparatus according to claim 16, wherein said sheaths are composed of a material selected from the group consisting of thermoplastic material, extrudable material, plastics material, and vulcanizable elastomer.

19. The fiber-optic apparatus according to claim 16, wherein an acceptance angle is greater than or equal to a beam angle of the radiation emitted on the fast axis from the diode laser bar.

20. The fiber-optic apparatus according to claim 1, wherein said optical fiber bundle has a diameter of $d \leq 8$ mm.

21. The fiber-optic apparatus according to claim 20, wherein said diameter of said optical fiber bundle is in a range between 2 mm and 5 mm.

22. The fiber-optic apparatus according to claim 1, wherein said fibers in said optical fiber bundles have a numerical aperture in a range between NA=0.10 and NA=0.87.

23. The fiber-optic apparatus according to claim 22, wherein said fibers have a numerical aperture of NA=0.66.

24. The fiber-optic apparatus according to claim 1, wherein said optical fiber bundles have individual fibers, and said individual fibers have a diameter of between 30 μm and 100 μm.

25. The fiber-optic apparatus according to claim 1, wherein said optical fiber bundle has a diameter of substantially d=2.8 mm and comprises approximately 1300 individual fibers with a diameter of substantially 70 μm.

26. The fiber-optic apparatus according to claim 1, wherein said optical fibers in an optical fiber bundle are adhesively bonded by way of a high-temperature adhesive in a sleeve composed of a material selected from the group consisting of glass, ceramic, and metal prior to a hot-pressing process.

27. The fiber-optic apparatus according to claim 26, wherein the adhesive is an epoxy resin, polysilazane or ceramic adhesive.

28. The fiber-optic apparatus according to claim 1, wherein, on the inlet surface, said optical fiber bundle has a width of approximately 10-12 mm and a height of approximately 0.2-0.7 mm.

\* \* \* \* \*